Patented May 19, 1931

1,805,714

UNITED STATES PATENT OFFICE

RAINALD BRIGHTMAN, OF BLACKLEY, MANCHESTER, ENGLAND, ASSIGNOR TO IMPERIAL CHEMICAL INDUSTRIES LIMITED, OF WESTMINSTER, ENGLAND

MANUFACTURE OF AZO DYES

No Drawing. Application filed February 12, 1930, Serial No. 427,959, and in Great Britain February 21, 1929.

This invention relates to the manufacture of valuable new azo dyestuffs which may be obtained by combining a diazotized oxamic acid derivative of a 4:4'-diaminodiphenylsulphide of the general formula

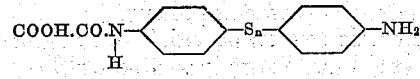

where $n$ represents 1 or 3 with one molecular proportion of any of the usual coupling components. The coupling may be performed in acid or alkaline solution as may be necessary.

The thus obtained dyestuffs may be represented by the formula

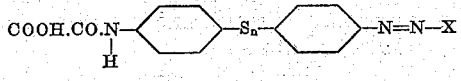

when $n$ represents 1 or 3 and X represents the residue of a coupling component. According to the coupling components chosen these dyestuffs dye wool or regenerated cellulose or cellulose esters or ethers for instance acetate rayon in shades varying from yellow to violet to brown and are characterized by yielding on reduction an oxamic acid derivative of a 4:4'-diaminodiphenylsulphide of the general formula

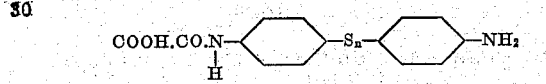

where $n$ represents 1 or 3, and an amidated coupling component X.NH$_2$ where X represents the residue of a coupling component.

Advantageous dyes are formed when the diazotized oxamic acid derivative is coupled with an aminonaphthol sulphonic acid, the amino group of which may be substituted. These dyes in the form of the free acid can be represented by the probable general formula

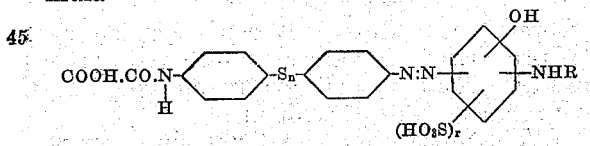

wherein $n$ represents 1 or 3, $r$ represents 1 or 2 and R represents hydrogen or an aryl group.

My invention is illustrated but not limited by the following examples, in which the parts are by weight.

*Example 1.*—216 parts of 4:4'-diaminodiphenyl sulphide, m. p. 108° C., are boiled with 500 parts of oxalic acid crystals and about 4000 parts of water.

The diaminodiphenyl sulphide goes into solution and after some time a white crystalline product separates. This is filtered hot after about 20 hours, washed with warm water, and then stirred for a short time in a little warm dilute hydrochloric acid to remove any unchanged base. The 4-aminodiphenyl sulphide-4'-oxamic acid is finally filtered, washed and dried. It does not melt below 265° C.

*Example 2.*—280 parts of 4:4'-diaminodiphenyltrisulphide, m. p. 122° C., are boiled with 400 parts of oxalic acid crystals and about 4000 parts of water for 20 hours. The 4-aminodiphenyltrisulphide-4'-oxamic acid is isolated and purified exactly as described in Example 1. It forms a pale yellowish powder which does not melt below 290° C.

*Example 3.*—288 parts of 4-aminodiphenylsulphide-4'-oxamic acid are dissolved in hot water with the aid of a slight excess of ammonia. The excess of ammonia is removed by boiling, the solution cooled and after treating with 69 parts of sodium nitrite, poured on to a mixture of ice and 300 parts of 36 per cent hydrochloric acid. The bright yellow suspension of the diazo compound is stirred for half an hour and is then added to a solution of 337 parts of the sodium salt of 2-phenylamino-5-naphthol-7-sulphonic acid containing 300 parts of sodium carbonate. The mixture is stirred until coupling is complete when it is heated up and the dyestuff isolated by the addition of common salt. It dyes viscose rayon in bright bluish red shades. If in place of the 2-phenylamine-5-naphthol-7-sulphonic acid there is used a solution containing 319 parts of 1-amino-8-naphthol-2:4-disulphonic acid, the dyestuff obtained dyes viscose rayon in violet shades.

Similarly the use of a solution of 315 parts of 2-phenylamino-8-naphthol-6-sulphonic acid affords a dyestuff giving brown dyeings on wool fast to milling and stoving. This dyestuff as sodium salt is represented most probably by the constitution

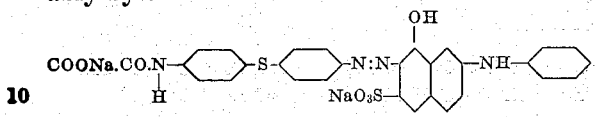

It yields on reduction 4-aminodiphenylsulphide-4'-oxamic acid and 2-phenylamino-7:8 - aminonaphthol - 6 - sulphonic acid. It dissolves in concentrated sulphuric acid giving a grenish-blue solution which changes to violet brown on gradual dilution with water ultimately yielding a brown precipitate.

*Example 4.*—352 parts of 4-aminodiphenyltrisulphide-4'-oxamic acid are diazotized with 69 parts of sodium nitrite and 300 parts of 36 per cent hydrochloric acid by the method described in Example 3. The suspension is run into a solution of 138 parts of salicylic acid and 600 parts of sodium carbonate and stirred until coupling is complete. The mixture is then heated up and the dyestuff isolated by the addition of common salt. It dyes cellulose acetate rayon in bright yellow shades, and wool a yellow shade fast to milling. If in place of the salicylic acid there is used a solution of 239 parts of 2-amino-5-naphthol-7-sulphonic acid, the dyestuff obtained dyes viscose rayon in even yellowish red shades.

*Example 5.*—To the suspension of diazo compound obtained from 352 parts of 4-amino-diphenyltrisulphide-4'-oxamic acid as described in Example 4 there is added a neutral solution containing 254 parts of 1-4'-sulphophenyl-3-methyl-5-pyrazolone. The mixture is stirred until coupling is complete, when it is made alkaline, heated up and the dyestuff isolated by the addition of common salt. It gives yellow dyeings on wool which are of excellent fastness to milling. If in place of the pyrazolone solution there is added a neutral solution containing 223 parts of 2-naphthylamine-6-sulphonic acid, the dyestuff obtained dyes wool in orange-yellow shades fast to milling and viscose rayon in very level orange yellow shades.

Having now particularly described and disclosed the nature of my said invention and in what manner the same is to be performed, I declare that what I claim is:—

1. In the process of manufacturing new azo dyestuffs probably represented in the form of the free acid by the formula

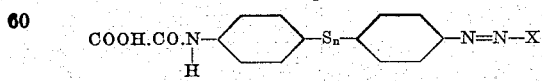

where $n$ represents 1 or 3 and X represents the residue of a coupling component; the step which comprises combining a diazotized oxamic acid derivative of a 4:4'-diaminodiphenylsulphide of the formula

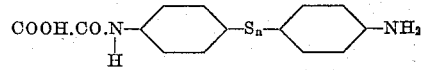

when $n$ represents 1 or 3 with an azo dyestuff component.

2. In the process of manufacturing new azo dyestuffs probably represented in the form of the free acid by the general formula

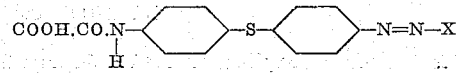

where X represents the residue of a coupling component; the step which comprises combining a diazotized oxamic acid derivative of the formula

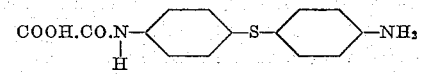

with an azo dyestuff component.

3. New azo dyestuffs which in the form of the free acid may be represented by the probable general formula

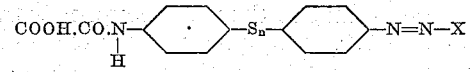

where $n$ represents 1 or 3 and X represents the residue of a coupling component.

4. New azo dyestuffs which in the form of the free acid may be represented by the probable general formula

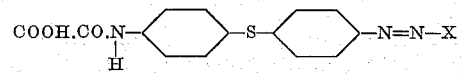

where X represents the residue of a coupling component.

5. The new azo dyestuff which in the form of the free acid may be represented by the probable formula

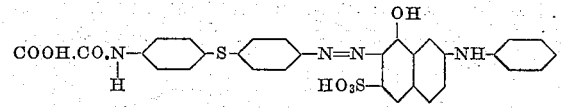

which yields on reduction 4-aminodiphenylsulphide-4'-oxamic acid and 2-phenylamino-7:8-aminonaphthol-6-sulphonic acid and which dissolves in concentrated sulphuric acid giving a greenish-blue solution which changes to violet brown on gradual dilution with water finally yielding a brown precipitate.

6. In the manufacture of new azo dyestuffs, the process which comprises reacting a compound of the probable formula

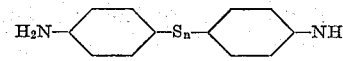

wherein $n$ represents 1 or 3, with one molecular proportion of oxalic acid, diazotizing the resulting oxamic acid derivative and coupling with an azo dyestuff component.

7. The process of claim 6 wherein $n$ represents 1.

8. The process of claim 6 wherein the diazotized oxamic acid derivative is coupled with an amino naphthol sulphonic acid, the amino group of which may be substituted.

9. The process of claim 6 wherein $n$ represents 1 and the diazotized oxamic acid derivative is coupled with an amino naphthol sulphonic acid, the amino group of which may be substituted.

10. In the process of manufacturing new azo dyestuffs which in the form of the free acid may be represented by the probable formula

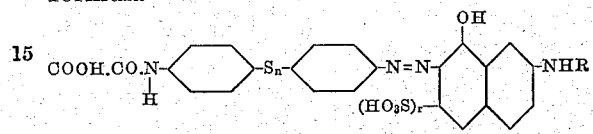

wherein $n$ represents 1 or 3, $r$ represents 1 or 2 and R represents hydrogen or an aryl group; the step which comprises diazotizing an oxamic acid derivative of the probable formula

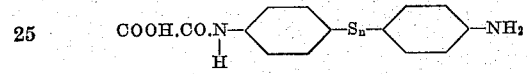

and coupling the resulting diazo compound with an aminonaphthol sulphonic acid, the amino group of which may be substituted.

11. The process of claim 10 wherein $n$ represents 1, $r$ represents 1 and R represents a phenyl group, the diazotized oxamic acid derivative being coupled with a phenylamino naphthol sulphonic acid.

12. New azo dyestuffs which in the form of the free acid may be represented by the probable general formula

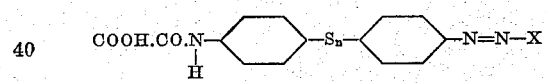

wherein $n$ represents 1 or 3 and X represents the coupled residue of an aminonaphthol sulphonic acid, the amino group of which may be substituted.

13. The new azo dyestuffs of claim 12 wherein $n$ represents 1.

14. The new azo dyestuffs of claim 12 wherein the coupled aminonaphthol sulphonic acid is selected from a group consisting of 2-phenylamino-5-naphthol-7-sulphonic acid, 1-amino-8-naphthol-2:4-disulphonic acid, 2-phenylamino-8-naphthol-6-sulphonic acid and 2-amino-5-naphthol-7-sulphonic acid.

15. The new dyestuffs of claim 12 wherein $n$ represents 1 and the coupled aminonaphthol sulphonic acid is selected from a group consisting of 2-phenylamino-5-naphthol-7-sulphonic acid, 1-amino-8-naphthol-2:4-disulphonic acid, 2-phenylamino-8-naphthol-6-sulphonic acid and 2-amino-5-naphthol-7-sulphonic acid.

16. The new azo dyestuffs which in the form of the free acid may be represented by the probable formula

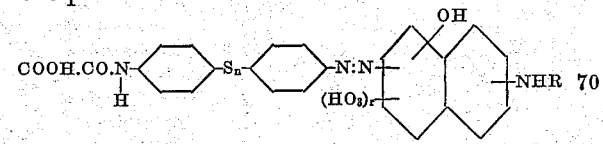

wherein $n$ represents 1 or 3, $r$ represents 1 or 2 and R represents hydrogen or an aryl group.

17. The new azo dyes of claim 16 wherein $n$ represents 1, $r$ represents 1 and R represents a phenyl group.

18. The new azo dyestuff which in the form of the free acid may be represented by the probable formula

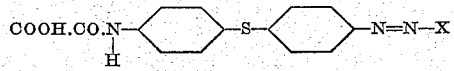

wherein X represents coupled 2-phenylamino-5-naphthol-7-sulphonic acid.

19. The new azo dyestuff which in the form of the free acid may be represented by the probable formula

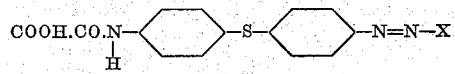

wherein X represents coupled 1-amino-8-naphthol-2:4-disulphonic acid.

In testimony whereof I affix my signature.

RAINALD BRIGHTMAN.

Certificate of Correction

Patent No. 1,805,714.                                Granted May 19, 1931, to

RAINALD BRIGHTMAN

It is hereby certified that error appears in the printed specification of the above-numbered patent requiring correction as follows: Page 1, strike out the formula between lines 45 to 47, and insert

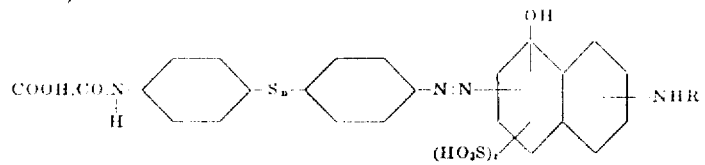

Page 3, claim 10, strike out the formula between lines 14 and 17, and insert

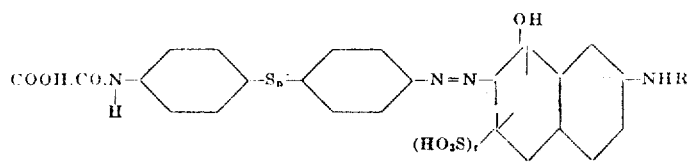

Same page, claim 16, strike out the formula between lines 69 and 71, and insert

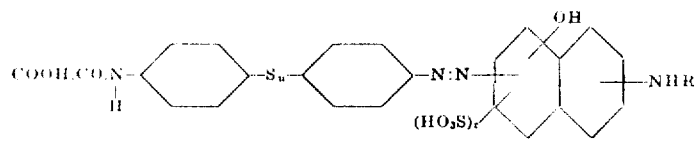

and that the said Letters Patent should be read with these corrections therein that the same may conform to the record of the case in the Patent Office.

Signed and sealed this 7th day of July, A. D. 1931.

[SEAL.]

M. J. MOORE,
*Acting Commissioner of Patents.*